(12) United States Patent
Chhuor et al.

(10) Patent No.: US 8,549,127 B2
(45) Date of Patent: Oct. 1, 2013

(54) ACTIVATING A BLADE SERVER IN A BLADE SERVER SYSTEM

(75) Inventors: CheKim Chhuor, Shanghai (CN); Yi Zhen Xu, Shanghai (CN); Hai Jun Zhong, Shanghai (CN); Ning Jie Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/844,441

(22) Filed: Jul. 27, 2010

(65) Prior Publication Data

US 2011/0029652 A1 Feb. 3, 2011

(30) Foreign Application Priority Data

Jul. 31, 2009 (CN) .......................... 2009 1 0159692

(51) Int. Cl.
*G06F 15/173* (2006.01)
*G06F 15/16* (2006.01)
*G06F 9/455* (2006.01)

(52) U.S. Cl.
USPC ............................... 709/223; 709/229; 718/1

(58) Field of Classification Search
USPC ..................... 709/223, 229; 718/1
See application file for complete search history.

(56) References Cited

U.S. PATENT DOCUMENTS

| 7,483,974 | B2 | 1/2009 | Goud et al. | |
|---|---|---|---|---|
| 2005/0076107 | A1* | 4/2005 | Goud et al. | 709/223 |
| 2006/0184349 | A1* | 8/2006 | Goud et al. | 703/24 |
| 2007/0255865 | A1 | 11/2007 | Gaither | |
| 2008/0183880 | A1* | 7/2008 | Sasage et al. | 709/229 |
| 2008/0201455 | A1 | 8/2008 | Husain | |
| 2008/0201711 | A1 | 8/2008 | Husain | |
| 2008/0243947 | A1* | 10/2008 | Kaneda | 707/203 |
| 2008/0263544 | A1* | 10/2008 | Amano et al. | 718/1 |
| 2009/0113110 | A1* | 4/2009 | Chen et al. | 711/6 |
| 2009/0144416 | A1* | 6/2009 | Chatley et al. | 709/224 |
| 2009/0248869 | A1* | 10/2009 | Ghostine | 709/225 |

FOREIGN PATENT DOCUMENTS

CN 1936839 3/2007

OTHER PUBLICATIONS

S. W. Hunter et al., "BladeCenter Networking", Nov. 2005, IBM J. Res. & Dev. vol. 49 No. 6, pp. 905-919.*
Czajkowski, G.; Wegiel, M.; Daynes, L.; Palacz, K.; Jordan, M.; Skinner, G.; Bryce, C., "Resource management for clusters of virtual machines," Cluster Computing and the Grid, 2005. CCGrid 2005. IEEE International Symposium on , vol. 1, no., pp. 382,389 vol. 1, May 9-12, 2005.*

(Continued)

*Primary Examiner* — Lynn Feild
*Assistant Examiner* — Taylor Elfervig
(74) *Attorney, Agent, or Firm* — The Steadman Law Firm PLLC; Thomas E. Tyson

(57) ABSTRACT

A method, apparatus, and computer program product are provided for activating a blade server in a blade server system. The method comprises receiving a request for activating the blade server and obtaining a hardware feature of the blade server. The method further comprises determining a virtual machine management program corresponding to the hardware feature of the blade server in accordance with a correspondence relationship between the hardware feature of the blade server and the virtual machine management program and remotely activating the blade server via a management bus by using the determined virtual machine management program. In accordance with the method, a suitable built-in virtual machine management program may be determined according to user requirements, and system security and stability upon blade server activation may be ensured.

20 Claims, 5 Drawing Sheets

(56) References Cited

OTHER PUBLICATIONS

Introducing Binarykarma and Their Multi-Hypervisor Platform, Fluidvm, http://vmblog.com/archive/2008/03/14/introducing-binarykarma-and-their-multi-hypervisor-platform-fluidvm.aspx.

Virtualization Solution Offers Multi-Hypervisor Support, May 28, 2008, http://news.thomasnet.com/fullstory/Virtualization-Solution-offers-multi-hypervisor-support-544802.

Time to Rethink Backup and Recovery—Virtualization Changes the Paradigm, Sep. 1, 2008, http://itresources.whatis.com/document;100690/tech-research.htm.

* cited by examiner

ACTIVATING A BLADE SERVER IN A BLADE SERVER SYSTEM

RELATED APPLICATION

This application claims priority under 35 U.S.C. §119 to Patent Application No. 200910159692.3 filed Jul. 31, 2009, the entire text of which is specifically incorporated by reference herein.

TECHNICAL FIELD

The various embodiments described herein generally relate to the field of blade servers. More specifically, the various embodiments relate to a method, apparatus, and computer program product for activating a blade server in a blade server system.

BACKGROUND

Server virtualization technology has been widely accepted in the IT industry and has become an advanced approach with which a data center operates a variety of workloads. Server virtualization technology enables a plurality of different small-scale tasks to be consolidated into one server, thereby saving energy and enabling a resource server to flexibly manage resources. In the context of server virtualization technology, a virtual machine management program is a software program located between server hardware and operating system software that can provide hardware abstraction and resource distribution for an operating system (i.e., virtualize hardware of a server). A server on which a virtual machine program is installed can install a plurality of different operating systems on the server hardware with allowed resources under management of the virtual machine management program in accordance with user requirements. In such case, the different operating systems operate independently of one another.

Server virtualization technology involves substantial market competition, and virtual machine management program providers constantly add new features to virtual machine management program code. As a result, inevitable program deficiencies arise, and consequently the virtual machine management program is at risk of becoming unstable. Thus, it is necessary to continuously mend the program to address any program deficiencies.

A novel strategy for virtual machine management program providers is to provide a built-in virtual machine management program such that customers can easily install a virtual machine. When a built-in virtual machine management program is used, installing a hardware driver is not necessary, and the virtual machine management program is generally built-in to a memory chip, similarly to firmware and BIOS. The functions of the built-in virtual machine management program are similar to those of a common virtual machine management program, but some management functions from a code package of the virtual machine management program are left out in order to reduce the code package size. Built-in virtual machine management programs for business applications include VMware ESXi, Red Hat oVirt, Citrix XenExpress OEM Edition, etc. VMware ESX is a virtual machine management program having a service management platform and a CIM agent that is stored on a DVD and is a complete installable program. By contrast, VMware ESXi is a built-in virtual machine management program that requires only 30 MB of space and that does not have all built-in management functions.

Hardware providers in support of built-in virtual machine management programs assume high costs, as they need to redesign system mainboards to provide flash memory chips. Specifically, it is necessary to add system firmware options activated from a virtual machine management program in a flash memory chip. Furthermore, it is necessary to add software functions to manage the content in the flash memory chip, e.g., functions for managing the chip content when the virtual machine management program in the flash memory chip is updated. Due to the increased costs, hardware providers currently can only support built-in virtual machine management for some products on a product line.

There are conventional schemes in which it may be unnecessary to add a built-in virtual machine management program in a flash memory chip of a mainboard. For instance, in accordance with some conventional schemes, the built-in virtual machine management program is placed in a local hard disk, USB, CDROM, or in a remote end server. However, placement of the built-in virtual machine management program in the local hard disk of the server is inconvenient in terms of updating, mending, or performing other maintenance functions with respect to the built-in virtual machine management program. Moreover, placement of the built-in virtual machine management program in the USB or CDROM is inconvenient for remote management, and for a high-density blade server, access to the USB and CDROM may be very limited. In addition, when the built-in virtual machine management program is placed in the remote end server, support for remote activation protocols such as Pre-boot Execution Environment (PXE) is required; more specifically, in this scheme, the data center is required to have been installed with a highly available PXE infrastructure with complete functions, and a network connection is required between the data center and the PXE infrastructure. Not all data centers can satisfy such conditions. Furthermore, since PXE carries out data transmission by using an external network connection, issues with respect to security and stability may occur upon activation. In sum, all of the conventional schemes present various issues.

SUMMARY

In view of the aforementioned issues with respect to the conventional art, the various embodiments described herein provide a method, apparatus, and computer program product for activating a blade server in a blade server system.

In accordance with a first aspect of the various embodiments, a method is provided for activating a blade server in a blade server system. The method comprises receiving a request for activating the blade server and obtaining a hardware feature of the blade server. Moreover, the method comprises determining a virtual machine management program corresponding to the hardware feature of the blade server in accordance with a correspondence relationship between the hardware feature of the blade server and a virtual machine management program and remotely activating the blade server via a management bus by using the determined virtual machine management program. The method further comprises storing the correspondence relationship in the blade server system. Additionally, the determined virtual machine management program is stored in the blade server system. Furthermore, one or more steps of the method may be executed by a management module of the blade server system.

According to an embodiment, in response to determining that a plurality of virtual machine management programs corresponding to the hardware feature of the blade server are stored in the blade server system, determining the virtual machine management program corresponding to the hardware feature of the blade server comprises selecting a virtual machine management program from the plurality of virtual machine management programs.

According to another embodiment, in response to determining that there is no virtual machine management program corresponding to the hardware feature of the blade server stored in the blade server system, determining the virtual machine management program corresponding to the hardware feature of the blade server comprises transmitting to a remote server a request for a virtual machine management program corresponding to the hardware feature of the blade server. Moreover, in response to determining that there is a virtual machine management program corresponding to the hardware feature of the blade server stored in the remote server, the determining step further comprises obtaining the virtual machine management program from the remote server, storing the virtual machine management program in the blade server system, and selecting the virtual machine management program. In addition, the determining step further may comprise updating the correspondence relationship.

According to another embodiment, in response to determining that there is no virtual machine management program corresponding to the hardware feature of the blade server stored in the blade server system, determining the virtual machine management program corresponding to the hardware feature of the blade server comprises transmitting to a first remote server a request for a virtual machine management program corresponding to the hardware feature of the blade server. In response to determining that there is no virtual machine management program corresponding to the hardware feature of the blade server stored in the first remote server, the determining step further comprises requesting a remote server address update such that a second remote server may be accessed. In addition, the determining step may comprise receiving the remote server address update and transmitting to the second remote server the request for a virtual machine management program corresponding to the hardware feature of the blade server. Moreover, in response to determining that there is a virtual machine management program corresponding to the hardware feature of the blade server stored in the second remote server, the determining step further comprises obtaining the virtual machine management program from the remote server, storing the virtual machine management program in the blade server system, and selecting the virtual machine management program. In addition, the determining step further may comprise updating the correspondence relationship.

In accordance with a second aspect of the various embodiments, an apparatus is provided for activating a blade server in a blade server system. The apparatus may be located in the blade server system. The apparatus comprises a receiving module for receiving a request for activating the blade server and an obtaining module for obtaining a hardware feature of the blade server. Moreover, the apparatus comprises a storage module for storing at least one virtual machine management program. Furthermore, the apparatus comprises a determining module for determining a virtual machine management program corresponding to the hardware feature of the blade server in accordance with a correspondence relationship between the hardware feature of the blade server and the virtual machine management program and a processing module for remotely activating the blade server via a management bus by using the determined virtual machine management program.

The storage module of the apparatus may be further used for storing the correspondence relationship, and the determining module may comprise an updating module for updating the correspondence relationship as appropriate. Furthermore, the determining module may be used for activities analogous to those described in the embodiments of the aforementioned method.

In accordance with a third aspect of the various embodiments, a computer program product is provided for activating a blade server in a blade server system. The computer program product comprises a computer readable storage medium having computer-readable program code instructions. The instructions may comprise sets of instructions analogous to the process steps described with respect to the aforementioned method. One or more of the sets of instructions may be executed by a management module of the blade server system.

The various embodiments provide one or more of the following advantages:

(1) Hardware manufacturers may provide support of a built-in virtual machine management program for all products on their product lines without having to redesign related hardware.

(2) A suitable built-in virtual machine management program may be selected according to user requirements, and security and stability upon activation may be ensured.

(3) Relatively few alterations, if any, need be made in the existing hardware.

BRIEF DESCRIPTION OF THE DRAWINGS

The above and other objects, features, and advantages of the various embodiments become more apparent through the detailed description of exemplary embodiments. The various embodiments are to be explained further with reference to the attached drawings, in which.

DETAILED DESCRIPTION

Exemplary embodiments will be described in detail by referencing the drawings. However, the various embodiments can be carried out in various forms and shall not be understood as being restrained by the exemplary embodiments set forth herein. On the contrary, the exemplary embodiments are provided here for describing the various embodiments thoroughly and for conveying the scope of the various embodiments to those skilled in the art.

Figure 1:
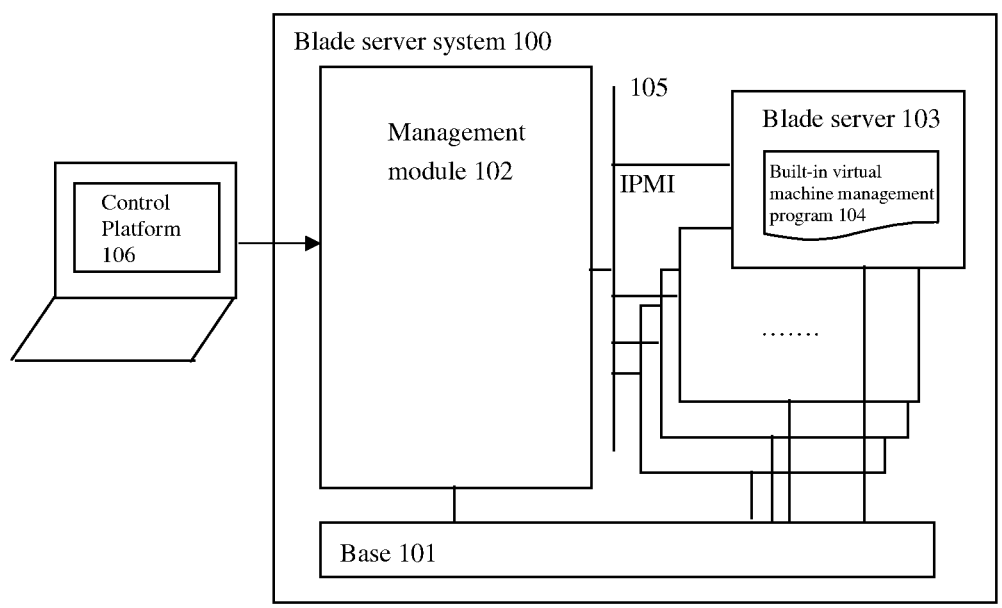
FIG. 1 schematically shows a view of a built-in virtual machine management program stored on a blade server in a conventional blade server system.

FIG. 1 schematically shows a view of a built-in virtual machine management program stored on a blade server in a conventional blade server system. A blade server system 100 shown in FIG. 1 comprises a management module 102 and at least one blade server 103. Moreover, the blade server system 100 comprises an I/O switching module, a power supply module, a fan, a network connection, and other modules not shown in the figure. These components are interconnected via a base 101. The management module 102 of the blade server system 100 provides a uniform management interface. The management module 102 is connected to each of the at least one blade server 103 via a management bus 105. The management of the blade server system conforms to the IPMI (Intelligent Platform Management Interface) standard. The center of an IPMI infrastructure is a microprocessor, i.e., a baseboard management controller (BMC). A BMC of each of the at least one blade server 103 provides functions such as autonomous monitoring, event logs, restoration of control and configuration for hardware of a respective blade server. Moreover, a BMC can collect tendency data, predict platform errors, and provide a uniform interface for the management module 102. The management module 102 communicates with a BMC via an IPMI message and supports functions such as power up, power down, event reports, and coordination of the use of shared resources among the at least one blade server 103. A control platform 106 is connected to the management module 102 and can transmit a management command to the management module 102. Furthermore, the management module 102 of the blade server system 100 has a network connection, but such network connection is generally specialized because of the particularity of the management module 102. If an external network could randomly access the management module 102 via the network connection such that an external party could control a blade server via the management bus 105, the security and stability of the entire blade server system 100 could be seriously threatened. Thus, external access to the network of the management module 102 is generally controlled by using a specialized technology, such as a firewall, so that the management module 102 can easily access the external network while preventing the external network from accessing the management module 102. Furthermore, the network connection of the blade server system 100 is isolated from the management bus 105 to ensure system security and stability.

Moreover, in accordance with the conventional art, a built-in virtual machine management program 104 is stored in the at least one blade server 103. The virtual machine management program 104 may be stored in various ways, e.g., in a flash memory on a mainboard of the at least one blade server 103, in a USB memory of the at least one blade server 103, in a hard disk of the at least one blade server 103, or in a network server connected to the at least one blade server 103, etc. The virtual machine management program 104 is generally configured upon leaving the factory or upon distribution. Updating or mending the virtual machine management program 104, if necessary, is inconvenient.

Furthermore, the built-in virtual machine management program 104 in accordance with the conventional art is directed to a specific hardware platform of the at least one blade server 103 and thus may not be compatible with another hardware platform. For example, VMware ESXi 3.5.2 supports a blade server of an IBM HS21 type but fails to support a blade server of an IBM HS22 type. Additionally, a virtual machine management program developed for a CPU of an X86 type can run on the Intel and AMD processors, but fails to run on a POWER processor. Accordingly, if a built-in virtual machine management program configured when leaving the factory is unfamiliar to a user, and such user intends to use a virtual machine management program from another manufacturer or intends to use another program version with which such user is more familiar, such user may encounter difficulty.

Figure 2:
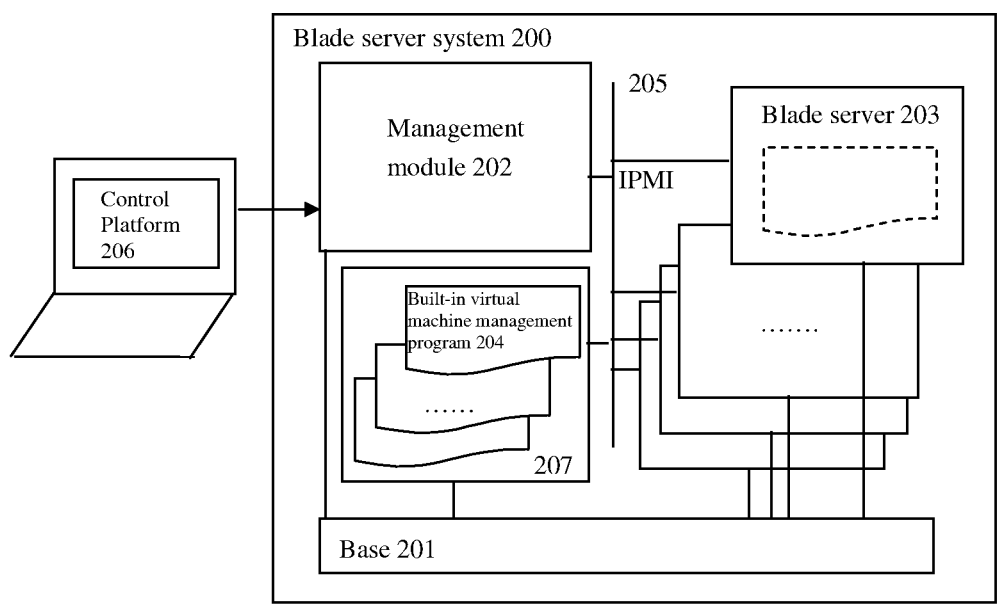
FIG. 2 schematically shows a view of a built-in virtual machine management program stored in a blade server system according to an exemplary embodiment.

FIG. 2 schematically shows a view of a built-in virtual machine management program stored in a blade server system according to an exemplary embodiment. In a blade server system 200 illustrated in FIG. 2, a module 207 is added. The module 207 may store at least one built-in virtual machine management program 204 and further may store a correspondence relationship between a hardware feature of at least one blade server 203 and a virtual machine management program among the at least one built-in virtual machine management program 204. In this way, a suitable built-in virtual machine management program can be selected according to user requirements. The module 207 may be an independent module. If the module 207 is an independent module, the costs for development may increase. Accordingly, the module 207 alternatively may be added to the management module 202. In accordance with another alternative, for activating a certain blade server, the module 207 may be located in a blade server activated without using a virtual machine management program. The module 207 may be connected to at least one blade server 203 in the blade server system 200 via a management bus 205 in order to ensure security and stability upon activation. The at least one blade server 203 can be activated remotely via the management bus 205 using a suitable virtual machine management program among the at least one built-in virtual machine management program 204.

Figure 3:
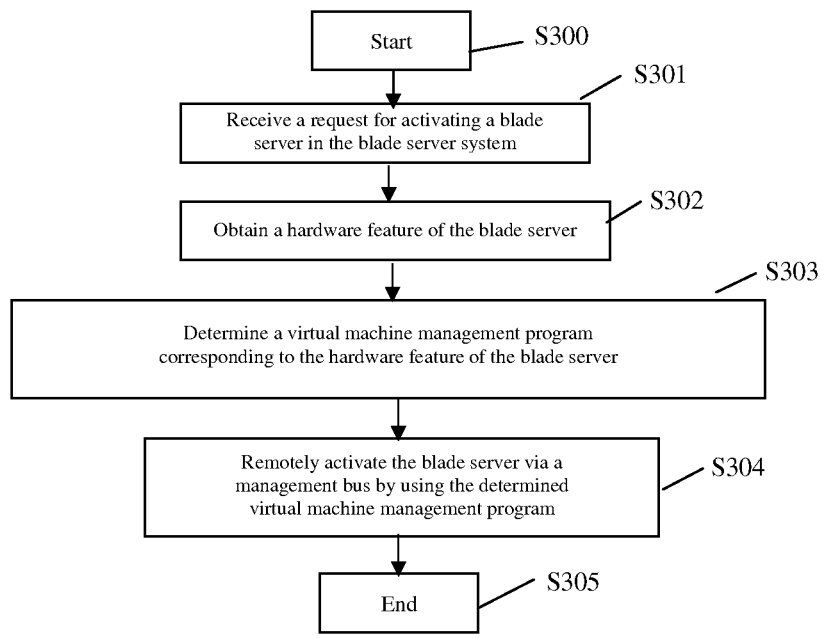
FIG. 3 schematically shows a method for activating a blade server in a blade server system according to an exemplary embodiment.

FIG. 3 shows a method for activating a blade server in a blade server system (e.g., the blade server system 200) according to an exemplary embodiment. The process provides how the module 207 functions with respect to other components of the blade server system 200 in order to satisfy user requirements. A built-in virtual machine management program can be used directly for activating a blade server and a virtual machine installed thereon. Each virtual machine may be considered as an independent computer on an independent hardware system, in which an independent operating system is installed. As illustrated in FIG. 3, the method starts at step S300. At step S301, a request is received for activating a blade server among the at least one blade server 203 of the blade server system 200. At step S302, a hardware feature of the blade server is obtained. At step S303, a virtual machine management program corresponding to the hardware feature of the blade server is determined. The virtual machine management program is determined in accordance with a correspondence relationship between the hardware feature of the blade server and the virtual machine management program. The determined virtual machine management program is stored in the blade server system 200. The determined virtual machine management program already may be stored in the blade server system 200; more specifically, the virtual machine management program already may be stored among the at least one built-in virtual machine management program 204. Alternatively, as further described herein, the determined virtual machine management program may be obtained from an external source (e.g., a remote server) and stored in the blade server system 200.

Subsequently, at step S304, the blade server is activated remotely via a management bus (e.g., the management bus 205) by using the determined virtual machine management program. In accordance with an exemplary embodiment, the blade server may be remotely activated by using Preboot Execution Environment (PXE). Moreover, the blade server may be activated by mounting a virtual machine management program in the blade server using a remote drive. Such remote drive may provide a storage device (such as a floppy-disk driver, a CD-ROM driver, a USB driver, or a device mirror file) of a local computer to a remote host and may act as a physical device in direct connection with the remote host.

Accordingly, the blade server, as the remote host, may regard the storage device loaded by the remote drive as a local physical device. When mounted by using a remote device, a virtual machine management program file may be packaged into an ISO9660 mirror file on a memory of the blade server system 200 so that the blade server can access the ISO9660 mirror file. ISO9660 is a widely supported mirror file format. The ISO9660 specification defines a file system with respect to a CD-ROM medium and supports various computer operating systems such as UNIX, Windows, and Mac OS, so that data can be exchanged between different platforms.

In addition, the determined virtual machine management program is mounted on the blade server via the management bus 205. Since the management bus 205 is isolated from the external network, security and stability upon activation may be improved. Finally, the method ends at step S305.

Figure 4:
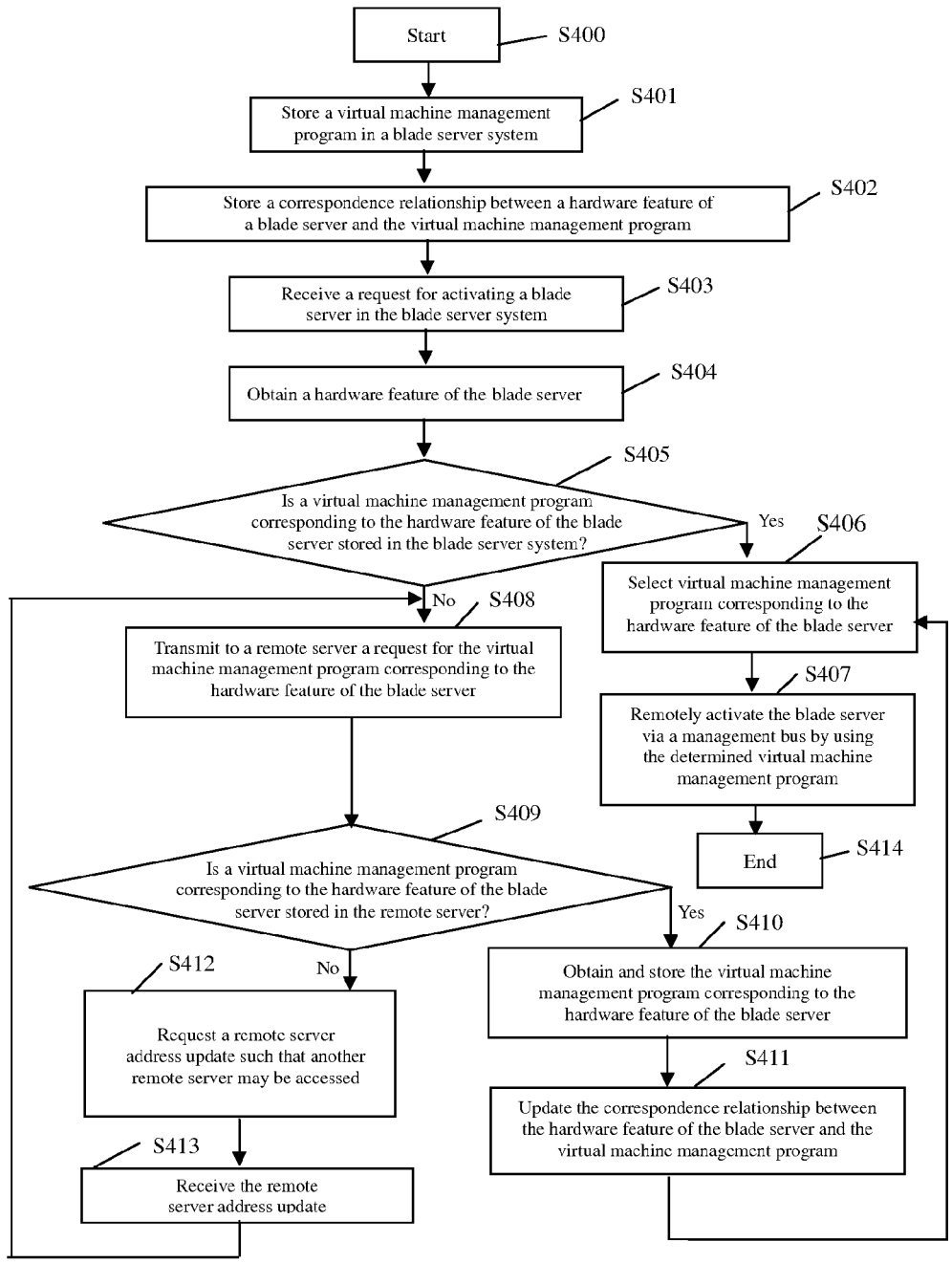
FIG. 4 schematically shows another method for activating a blade server in a blade server system according to an exemplary embodiment.

FIG. 4 shows another method for activating a blade server in a blade server system (e.g., the blade server system 200) according to an exemplary embodiment. This method is similar to the method provided in FIG. 3; however, as further described herein, this method includes additional process steps with respect to determining a virtual machine management program corresponding to a hardware feature of the blade server. As illustrated in FIG. 4, the method starts at step S400. At step S401, a virtual machine management program is stored in the blade server system 200. There may be a plurality of virtual machine management programs stored in the blade server system 200. At step S402, a correspondence relationship between a hardware feature of a blade server among the at least one blade server 203 and the virtual machine management program is stored in the blade server system 200. In an actual system, the virtual machine management program and the correspondence relationship between the hardware feature of the blade server and the virtual machine management program may be stored in another way. For example, third-party storage may be employed, or a medium storing such information may be directly inserted into a hardware device.

At step S403, a request for activating a blade server among the at least one blade server 203 is received. At step S404, a hardware feature of the blade server is obtained. The hardware feature of the blade server may be stored in the blade server system 200 in one of various ways, and the feature can be used so long as it can be directly obtained. For example, in a case where the type of the blade server acts as a hardware feature thereof, it can directly correspond to a suitable virtual machine manager. If the hardware feature is not stored, it is possible to transmit the feature along with the activation request. Furthermore, the hardware feature of the blade server can be obtained in one of various ways, such as via communication between the management module 202 and a baseboard controller. The hardware feature of the blade server comprises a plurality of types of hardware information that may be of different levels. For example, IBM Corporation may use the type of the blade server as its hardware type, because servers of different types may use different CPUs. Moreover, it is possible to use the type of a CPU corresponding to the hardware type. It is also possible to obtain a hardware feature of the blade server by using more complicated approaches. For instance, all hardware information such as information with respect to a CPU, a hard disk, and a master memory of the blade server may be collected via the management module 202 in the blade server system 200.

At step S405, it is determined whether a virtual machine management program corresponding to the obtained hardware feature of the blade server is among the virtual machine management programs stored in the blade server system 200.

It is noted that it is possible to ensure that a desired virtual machine management program is present without making such determination. For example, at least one virtual machine management program corresponding to each hardware feature of the blade server may be stored in advance and may be directly used for activation. Different hardware features require different virtual machine management programs or different virtual machine management program versions. The hardware features and the virtual machine management program versions have a multiple-to-multiple mapping relationship, and such mapping relationship may be stored in various ways. For example, such mapping relationship may be stored directly in a hard disk or in a memory, or such mapping relationship may be set by a user via a graphical user interface and subsequently stored.

If at step S405 it is determined that a virtual machine management program corresponding to the hardware feature of the blade server is among the virtual machine management programs stored in the blade server system 200, then at step S406 such virtual machine management program is selected in accordance with the correspondence relationship between the hardware feature of the blade server and the virtual machine management program. The hardware features and the virtual machine management program versions have a multiple-to-multiple mapping relationship. Accordingly, a selection may be made in the event that the hardware feature of the blade server corresponds to a plurality of virtual machine management programs stored in the blade server system 200. When making such selection among a plurality of virtual machine management programs, a virtual machine management program supporting the hardware feature may be randomly selected. Alternatively, a program among a plurality of virtual machine management programs supporting the hardware feature may be selected in accordance with user preference. In accordance with another alternative, a program among a plurality of virtual machine management programs supporting the hardware feature may be selected based one or more conditions (i.e., settings may be designated to select a program based one or more conditions). In sum, in the event that there is more than one virtual machine management programs corresponding to the hardware feature of the blade server stored in the blade server system 200, step S406 may include a substep of selecting a program among such plurality of virtual machine management programs. Then, at step S407, the selected virtual machine management program is used for remotely activating the blade server via a management bus (e.g., the management bus 205). Then, at step S414, the process ends.

Conversely, if at step S405 it is determined that no virtual machine management program corresponding to the hardware feature of the blade server is stored in the blade server system 200, then a message indicating a failure to determine the virtual machine management program corresponding to the hardware feature of the blade server is returned. Upon receipt of such message, the process proceeds to step S408, in which a request for a virtual machine management program corresponding to the hardware feature of the blade server is transmitted to a remote server. Generally, it is possible to set a remote server address in the blade server system 200 in order to access a remote server. Such remote server can function as a storage center for virtual machine management programs corresponding to the hardware of various types of blade servers. A blade server manufacturer can provide a plurality of virtual machine management programs corresponding to various blade servers produced by the manufacturer.

At step S409, it is determined whether a virtual machine management program corresponding to the hardware feature of the blade server is stored in the remote server to which the request was transmitted in step S408. If it is determined that a virtual machine management program corresponding to the hardware feature of the blade server is stored in the remote server, then at step S410 the virtual machine management program is obtained via a network and is stored in the blade server system 200. At step S411, the correspondence relationship between the hardware feature of the blade server and the virtual machine management program is updated. Then, the process returns to step S406.

If at step S409 it is determined that a virtual machine management program corresponding to the hardware feature of the blade server is not present in the remote server, then at step S412 a remote server address update is requested such that another remote server may be accessed. That is to say, if the virtual machine management program corresponding to the hardware feature of the blade server is not stored in the remote server accessed at step S408, the remote server address that determines which remote server is accessed may be updated such that another remote server may be accessed. At step S413, the remote server address update is received, and consequently the remote server to be accessed by the blade server system 200 is changed. Subsequently, the process returns to step S408.

One or more of the method steps as illustrated in FIG. 4 may be carried out as management functions of the management module 202 (i.e., one or more method steps may be executed by the management module 202). In such case, obtaining the hardware feature of the blade server is relatively simple, as the management module 202 can obtain the relevant information.

Figure 5:
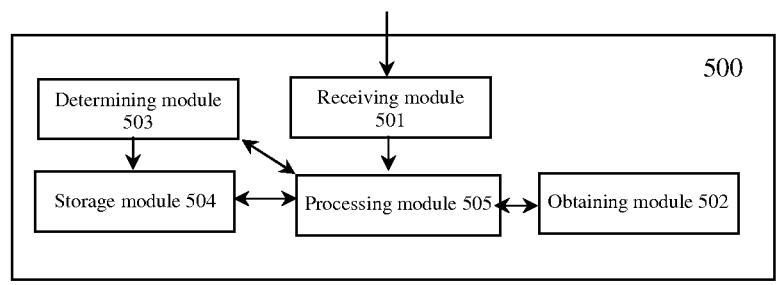
FIG. 5 schematically shows a block diagram of an apparatus for activating a blade server in a blade server system according to an exemplary embodiment.

Under the same inventive concept, FIG. 5 schematically shows a block diagram of an apparatus for activating a blade server in a blade server system (e.g., the blade server system 200) in accordance with an exemplary embodiment. An apparatus 500 corresponds to the module 207 of the blade server system 200. The apparatus 500 comprises a receiving module 501 for receiving a request for activating a blade server among the at least one blade server 203. Moreover, the apparatus 500 comprises an obtaining module 502 for obtaining a hardware feature of the blade server. Furthermore, the apparatus 500 comprises a determining module 503 for determining a virtual machine management program corresponding to the hardware feature of the blade server in accordance with the correspondence relationship between the hardware feature of the blade server and the virtual machine management program. Additionally, the apparatus 500 comprises a storage module 504 for storing at least one virtual machine management program, including the determined virtual machine management program corresponding to the hardware feature of the blade server. The storage module 504 further may store the correspondence relationship between the hardware feature of the blade server and the determined virtual machine management program. The apparatus 500 further comprises a processing module 505 for remotely activating the blade server via a management bus (e.g., the management bus 205) by using the determined virtual machine management program.

In accordance with an exemplary embodiment, the determining module 503 of the apparatus 500 may comprise a module (not shown) for determining whether the virtual machine management program corresponding to the hardware feature of the blade server is among the stored virtual machine management programs in the blade server system 200. In response to determining that a virtual machine management program corresponding to the hardware feature of the blade server is stored in the blade server system 200, the processing module 505 may control the virtual machine management program corresponding to the hardware feature of the blade server to be activated on the blade server.

In accordance with another exemplary embodiment, the obtaining module 502 of the apparatus 500 may comprise a collecting module (not shown) for collecting the hardware feature of the blade server.

In accordance with another exemplary embodiment, the determining module 503 of the apparatus 500 may comprise a selecting module (not shown). In response to determining that a plurality of virtual machine management programs corresponding to the hardware feature of the blade server are stored in the blade server system 200, the selecting module may select a program among the plurality of virtual machine management programs as the determined virtual machine management program corresponding to the hardware feature of the blade server.

In accordance with another exemplary embodiment, in response to determining that there is no virtual machine management program corresponding to the hardware feature of the blade server stored in the blade server system 200, the determining module 503 of the apparatus 500 may be used to transmit to a remote server a request for a virtual machine management program corresponding to the hardware feature of the blade server.

Moreover, in response to determining that there is a virtual machine management program corresponding to the hardware feature of the blade server stored in the remote server, the determining module 503 may obtain such program via a network and may store such program as the determined virtual machine management program.

In response to determining that no virtual machine management program corresponding to the hardware feature of the blade server is stored in the remote server, the determining module 503 of the apparatus 500 may be used to request a remote server address update such that another remote server may be accessed. Moreover, upon receiving the remote server address update, the determining module 503 may transmit to another remote server a request for a virtual machine management program corresponding to the hardware feature of the blade server. In response to determining that such program is present in the newly-accessed remote server, the determining module 503 may obtain such program via a network and may store such program as the determined virtual machine management program.

In accordance with another exemplary embodiment, the determining module 503 of the apparatus 500 may comprise an updating module (not shown) for updating the correspondence relationship between the hardware feature of the blade server and the virtual machine management program.

In accordance with a further exemplary embodiment, the apparatus 500 (or one or more of the modules thereof) may be incorporated into the management module 202 of the blade server system 200.

Although exemplary embodiments are described herein with reference to the drawings, it should be understood that the various embodiments are not limited to the exemplary embodiments. Various variations and modifications may be made to the exemplary embodiments by those skilled in the art without departing from the scope and spirit of the various embodiments. All such variations and modifications are intended to be included in the scope of the various embodiments defined in the appended claims.

Furthermore, those skilled in the art could know from the above description that the various embodiments may be embodied as a device, method, or a computer program product. Therefore, the various embodiments may be implemented completely in hardware, completely in software (including firmware, resident software, microcode, etc.), or via a combination of software and hardware. Moreover, as previously discussed the various embodiments may adopt the form of a computer program product embodied in any tangible medium of expression, wherein the medium comprises computer usable program code.

Any combination of one or more computer usable or computer readable mediums can be used. The computer usable or computer readable medium may be, but is not limited to, electrical, magnetic, optical, electromagnetic, infrared, or semiconductor systems, devices, appliances, or propagation mediums. Specific examples of the computer readable medium (a non-exhaustive list) include an electrical connection with one or more conductors, a portable computer disk, a hard disk, Random-Access Memory (RAM), Read-Only Memory (ROM), Erasable Programmable Read-Only Memory (EPROM or flash memory), portable Compact-Disk Read-Only-Memory (CD-ROM), optical memory device, or a magnetic memory device. In the context of this document, the computer usable or computer readable medium may be any medium that contains, stores, conveys, propagates, or transmits programs that are to be used by an instruction executing system, device, or appliance or are associated with the instruction executing system, device, or appliance. The computer usable medium may include data signals contained in the base-band or propagated as a part of the carrier wave and are embodied as computer usable program code. The computer usable program code may be transmitted with any suitable medium including but not limited to radio, electrical wire, optical cable, RF, etc. Furthermore, the computer usable or computer readable medium may comprise a storage medium directed to hardware.

The computer program code for executing the operation of the various embodiments described herein may be written with any combination of one or more programming languages. Such programming languages may include object-oriented programming languages such as Java, Smalltalk, C++ as well as conventional procedural programming languages such as "C" programming languages and similar programming languages. The program code may be completely run on a user's computer, run as an independent software package, partly run on the user's computer and partly run on a remote computer or server, or completely run on a remote computer or server. In the latter cases, the remote computer may be connected to the user's computer via any kind of network, including Local Area Network (LAN) or Wide Area Network (WAN), or may be connected to an external computer (e.g., via the Internet using an Internet Service Provider).

Furthermore, each block in the flow charts and/or block diagrams of the various embodiments and combinations of the blocks in the flowcharts and/or block diagrams may be implemented by using computer program instructions. Such computer program instructions may be provided to processors of a general use computer, a special use computer, or other programmable data processing devices in order to realize the functions/operations specified in the blocks of the flow charts and/or block diagrams.

The computer program instructions may be stored in a computer readable medium on which the computer or other programmable data processing devices operates in a specific manner. Thus, the instructions stored in the computer readable medium produce a product for realizing the functions/operations specified in the blocks of the flow charts and/or block diagrams.

The computer program instructions also may be loaded into the computer or other programmable data processing devices such that a series of operation steps are executed on the computer or other programmable data processing devices. The instructions executed on the computer or other programmable data processing devices provide a process for realizing the functions/operations specified in the blocks of the flow charts and/or block diagrams.

The flowcharts and block diagrams in the drawings illustrate architectures, functions, and operations that may be implemented by the system, method, and computer program product in accordance with the various embodiments. In this regard, each block in the flow charts or block diagrams may represent a module, a program segment or a code portion. The module, program segment, or the code portion include one or more executable instructions for executing the specified logical functions. It is noted that, in some alternative implementations, functions labeled in the blocks may appear in a different order from that labeled in the drawings. For example, two blocks connected successively in practice may be executed substantially in parallel with each other or in a reverse order. Moreover, it is noted that each block in the flow charts and/or block diagrams and combination of blocks in the flow charts and/or block diagrams can be implemented by a dedicated hardware-based system for executing the specified functions or operations, or by a combination of dedicated hardware with computer instructions.

What is claimed is:

1. A method for activating a blade server in a blade server system, the method comprising:
    receiving a request for activating the blade server;
    obtaining a hardware feature of the blade server;
    determining a virtual machine management program corresponding to the hardware feature of the blade server in accordance with a correspondence relationship between the hardware feature of the blade server and the virtual machine management program, wherein determining the virtual machine management program comprises, in response to determining that a plurality of virtual machine management programs corresponding to the hardware feature of the blade server are stored in the blade server system, selecting the virtual machine management program from the plurality of virtual machine management programs; and
    remotely activating, via a management bus, the blade server and a virtual machine installed on the blade server by using the determined virtual machine management program.

2. The method of claim 1, further comprising storing the correspondence relationship in the blade server system.

3. The method of claim 1, wherein the determined virtual machine management program is stored in the blade server system.

4. The method of claim 1, wherein determining the virtual machine management program further comprises:
    in response to determining that there is no virtual machine management program corresponding to the hardware feature of the blade server stored in the blade server system, transmitting to a remote server a request for a virtual machine management program corresponding to the hardware feature of the blade server; and
    in response to determining that there is a virtual machine management program corresponding to the hardware feature of the blade server stored in the remote server, obtaining the virtual machine management program from the remote server, storing the virtual machine management program in the blade server system, and selecting the virtual machine management program.

5. The method of claim 4, wherein determining the virtual machine management program further comprises updating the correspondence relationship.

6. The method of claim 1, wherein determining the virtual machine management program further comprises:
   in response to determining that there is no virtual machine management program corresponding to the hardware feature of the blade server stored in the blade server system, transmitting to a first remote server a request for a virtual machine management program corresponding to the hardware feature of the blade server;
   in response to determining that there is no virtual machine management program corresponding to the hardware feature of the blade server stored in the first remote server, requesting a remote server address update such that a second remote server may be accessed;
   receiving the remote server address update;
   transmitting to the second remote server the request for a virtual machine management program corresponding to the hardware feature of the blade server; and
   in response to determining that there is a virtual machine management program corresponding to the hardware feature of the blade server stored in the second remote server, obtaining the virtual machine management program from the second remote server, storing the virtual machine management program in the blade server system, and selecting the virtual machine management program.

7. The method of claim 6, wherein determining the virtual machine management program further comprises updating the correspondence relationship.

8. The method of claim 1, wherein one or more steps of the method are executed by a management module of the blade server system.

9. An apparatus for activating a blade server in a blade server system, the apparatus comprising:
   a receiving module configured for receiving a request for activating the blade server;
   an obtaining module configured for obtaining a hardware feature of the blade server;
   a storage module configured for storing at least one virtual machine management program;
   a determining module configured for determining a virtual machine management program corresponding to the hardware feature of the blade server in accordance with a correspondence relationship between the hardware feature of the blade server and the virtual machine management program and further configured for, in response to determining that a plurality of virtual machine management programs corresponding to the hardware feature of the blade server are stored in the storage module, selecting the virtual machine management program from the plurality of virtual machine management programs; and
   a processing module configured for remotely activating, via a management bus, the blade server and a virtual machine installed on the blade server by using the determined virtual machine management program.

10. The apparatus of claim 9, wherein the storage module is further configured for storing the correspondence relationship.

11. The apparatus of claim 9, wherein the determining module comprises an updating module for updating the correspondence relationship.

12. The apparatus of claim 9, wherein the determined virtual machine management program is stored in the storage module.

13. The apparatus of claim 9, wherein the determining module is further configured for:
   in response to determining that there is no virtual machine management program corresponding to the hardware feature of the blade server stored in the storage module, transmitting to a remote server a request for a virtual machine management program corresponding to the hardware feature of the blade server; and
   in response to determining that there is a virtual machine management program corresponding to the hardware feature of the blade server stored in the remote server, obtaining the virtual machine management program from the remote server, storing the virtual machine management program in the storage module, and selecting the virtual machine management program.

14. The apparatus of claim 9, wherein the determining module is further configured for:
   in response to determining that there is no virtual machine management program corresponding to the hardware feature of the blade server stored in the storage module, transmitting to a first remote server a request for a virtual machine management program corresponding to the hardware feature of the blade server;
   in response to determining that there is no virtual machine management program corresponding to the hardware feature of the blade server stored in the first remote server, requesting a remote server address update such that a second remote server may be accessed;
   receiving the remote server address update;
   transmitting to the second remote server the request for a virtual machine management program corresponding to the hardware feature of the blade server; and
   in response to determining that there is a virtual machine management program corresponding to the hardware feature of the blade server stored in the second remote server, obtaining the virtual machine management program from the second remote server, storing the virtual machine management program in the storage module, and selecting the virtual machine management program.

15. The apparatus of claim 9, wherein the apparatus is located in a management module of the blade server system.

16. A computer program product for activating a blade server in a blade server system, the computer program product comprising a non-transitory computer readable medium having computer-readable program code instructions stored therein comprising:
   a first set of instructions for receiving a request for activating the blade server;
   a second set of instructions for obtaining a hardware feature of the blade server;
   a third set of instructions for determining a virtual machine management program corresponding to the hardware feature of the blade server in accordance with a correspondence relationship between the hardware feature of the blade server and the virtual machine management program, wherein the third set of instructions comprises a fourth set of instructions for, in response to determining that a plurality of virtual machine management programs corresponding to the hardware feature of the blade server are stored in the storage module, selecting the virtual machine management program from the plurality of virtual machine management programs; and a fifth set of instructions for remotely activating, via a management bus, the blade server and a virtual machine installed on the blade server by using the determined virtual machine management program.

17. The computer program product of claim 16, wherein one or more of the sets of instructions are executed by a management module of the blade server system.

18. The computer program product of claim 16, wherein the third set of instructions further comprises:

a sixth set of instructions for, in response to determining that there is no virtual machine management program corresponding to the hardware feature of the blade server stored in the blade server system, transmitting to a remote server a request for a virtual machine management program corresponding to the hardware feature of the blade server; and a seventh set of instructions for, in response to determining that there is a virtual machine management program corresponding to the hardware feature of the blade server stored in the remote server, obtaining the virtual machine management program from the remote server, storing the virtual machine management program in the blade server system, and selecting the virtual machine management program.

19. The computer program product of claim 18, wherein the third set of instructions further comprises an eighth set of instructions for updating the correspondence relationship.

20. The computer program product of claim 16, wherein the third set of instructions further comprises:

a ninth set of instructions for, in response to determining that there is no virtual machine management program corresponding to the hardware feature of the blade server stored in the blade server system, transmitting to a first remote server a request for a virtual machine management program corresponding to the hardware feature of the blade server;

a tenth set of instructions for, in response to determining that there is no virtual machine management program corresponding to the hardware feature of the blade server stored in the first remote server, requesting a remote server address update such that a second remote server may be accessed;

an eleventh set of instructions for receiving the remote server address update;

a twelfth set of instructions for transmitting to the second remote server the request for a virtual machine management program corresponding to the hardware feature of the blade server; and a thirteenth set of instructions for, in response to determining that there is a virtual machine management program corresponding to the hardware feature of the blade server stored in the second remote server, obtaining the virtual machine management program from the second remote server, storing the virtual machine management program in the blade server system, and selecting the virtual machine management program.

* * * * *